US012722336B2

(12) United States Patent
Wang et al.

(10) Patent No.: US 12,722,336 B2
(45) Date of Patent: Sep. 1, 2026

(54) MATERIAL BASED ON POLYTETRAFLUOROETHYLENE AND PROCESS FOR PREPARING THE SAME

(71) Applicant: SHANDONG UNIVERSITY, Jinan (CN)

(72) Inventors: Guilong Wang, Jinan (CN); Jialong Chai, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 241 days.

(21) Appl. No.: 18/441,059

(22) Filed: Feb. 14, 2024

(65) Prior Publication Data

US 2024/0278473 A1 Aug. 22, 2024

(30) Foreign Application Priority Data

Feb. 17, 2023 (CN) ........................ 202310143242.5
Mar. 23, 2023 (CN) ........................ 202310309630.6

(51) Int. Cl.
*B29C 48/00* (2019.01)
*B29C 48/03* (2019.01)
*B29C 48/40* (2019.01)
*B29K 27/18* (2006.01)

(52) U.S. Cl.
CPC ............ *B29C 48/022* (2019.02); *B29C 48/03* (2019.02); *B29C 48/40* (2019.02); *B29K 2027/18* (2013.01)

(58) Field of Classification Search
None
See application file for complete search history.

(56) References Cited

U.S. PATENT DOCUMENTS

2005/0143508 A1* 6/2005 Tyagi ...................... C08L 69/00 524/451
2011/0014492 A1* 1/2011 Joshi .................. C23C 18/1641 427/322
2015/0082757 A1* 3/2015 Chaen ............... B01D 46/0001 55/482

FOREIGN PATENT DOCUMENTS

CN 114874485 A * 8/2022 ................ C08J 9/36

OTHER PUBLICATIONS

Machine English translation of CN114874485, accessed Dec. 5, 25 (Year: 2022).*

* cited by examiner

*Primary Examiner* — Abbas Rashid
*Assistant Examiner* — Adrianna K Konves
(74) *Attorney, Agent, or Firm* — Oliff PLC

(57) ABSTRACT

Provided a material based on polytetrafluoroethylene and process for preparing the same. The process includes using polytetrafluoroethylene and processing aids as raw materials, melt blending the raw materials followed by forming, and optionally undergoing post-processing; wherein the post-processing is selected from at least one of microporization, heat treatment, and surface treatment. The process has good versatility, capable of preparing various polytetrafluoroethylene membrane materials with thermal shrinkage properties or polytetrafluoroethylene microporous membrane materials, and the materials prepared possess excellent strength and toughness, being flexible and soft. Moreover, the membrane can be functionally modified in situ during the processing, avoiding complex post-processing modification and processing.

18 Claims, 6 Drawing Sheets

MATERIAL BASED ON POLYTETRAFLUOROETHYLENE AND PROCESS FOR PREPARING THE SAME

CROSS-REFERENCE TO RELATED APPLICATIONS

The present invention claims the benefit and priority of the Chinese patent application titled "heat-shrinkable material based on polytetrafluoroethylene nanofibers and process for preparing the same" filed on Feb. 27, 2023, with application number CN202310143242.5, and the Chinese patent application titled "polytetrafluoroethylene microporous membrane and process for functionalization preparation thereof" filed on Mar. 23, 2023, with application number CN202310309630.6. The entire contents of the aforementioned applications are incorporated herein by reference for all purposes.

TECHNICAL FIELD

The present invention belongs to the field of membrane materials technology, particularly relating to a material based on polytetrafluoroethylene (PTFE) and process for preparing the same.

BACKGROUND

Any discussion of the prior art throughout the specification should not be taken as an admission that such prior art is widely known or forms part of the common general knowledge in the art.

Currently, the majority of heat-shrinkable materials are made by chemically cross-linking linear polymer materials into a network polymer structure, which can shrink back upon heating after being expanded and cooled to set. However, cross-linked heat-shrinkable materials have a series of disadvantages. First, polymers that have been cross-linked possess "non-soluble and non-meltable" characteristics, making them difficult to recycle and reprocess, and they are also challenging to decompose in nature, leading to serious environmental damage. Second, heat-shrinkable materials generally require good flame retardant effects in applications, thus most cross-linked heat-shrinkable materials need to add a large amount of flame retardants, which also leads to certain environmental pollution. Third, most cross-linked heat-shrinkable materials are not breathable, which can lead to product spoilage due to moisture accumulation in fresh preservation.

PTFE microporous membranes with micro-nano scale porous structures have wide applications in air purification, ultra-pure filtration, seawater desalination, the electrical industry, textile fabrics, sealing, and other aspects. However, due to PTFE's high melting point, high melt viscosity, and insolubility in any solvent, it is difficult to prepare PTFE microporous membranes by conventional methods such as melt-blown, spinning, and phase separation. Also, due to PTFE's low surface energy, high stability, and high crystallinity, it is also difficult to produce functionally modified PTFE porous membrane products.

Currently, the mainstream commercialized manufacturing process of PTFE microporous membranes utilizes uniaxial or biaxial stretching to create a porous structure. In actual production, the final product quality is affected by factors such as blending methods, extrusion die design, calendering equipment precision, roller arrangement, drying methods, stretching equipment design, stretching rate, and ratio, leading to significant variations in the properties of PTFE microporous membranes. Therefore, the preparation of PTFE microporous membranes using traditional stretching methods requires significant equipment investment and involves a complex process. Additionally, due to the oriented stretching, the mechanical properties of the produced PTFE microporous membranes show anisotropy, causing inconvenience in use. Electrospinning technology is an advanced nanofiber manufacturing process that can be used to create organic or inorganic nanofibers stacked into a porous membrane. In the application of PTFE porous membranes, PTFE emulsion can be mixed with additive solutions and formed into a jet stream under a high-voltage electric field, which is solidified on a substrate to form a layer of fiber-stacked membranes. After sintering and setting, the preparation of PTFE porous membranes is achieved. The membrane morphology depends on factors such as voltage, solution components, and fluid flow rate, with the resulting PTFE fiber diameters ranging from approximately 0.5 to 3 micrometers. However, the production efficiency of the electrospinning process is low, and the cost of mass production is high, which has not yet been widely applied in actual commercial production. Additionally, PTFE porous membranes can be prepared by methods such as laser etching and porogen-induced porosity, but these processes result in membranes with low porosity, high process costs, and difficulty in achieving industrial production. Moreover, the functional modification of PTFE membranes remains very challenging. PTFE has a high melting point, no fluidity above the melting temperature, and its physicochemical properties are extremely stable, insoluble in any solvent, making it difficult to efficiently modify functionality through traditional melt blending or solution blending methods. Simultaneously, due to PTFE's extremely low surface energy and stable molecular structure, conventional surface treatment modification effects are poor.

SUMMARY

The present invention aims to provide an efficient and environmentally friendly process for producing materials based on PTFE, including PTFE membrane materials, PTFE microporous membrane materials, and functionalized PTFE microporous membrane materials. The process integrates the advantages of versatility, simplicity in processing, economic benefits, environmental friendliness, multifunctionality, and in-situ modification, significantly improving a series of issues present in the current technology. The widespread application of the process will contribute to advancing the field of material science towards a direction that is more environmentally friendly, efficient, multifunctional, and customizable.

The technical solutions of the present invention are described as follows.

In a first aspect of the present invention, provided a process for preparing a material based on PTFE, comprising:

using PTFE and processing aids as raw materials, melt blending the raw materials, followed by forming the resulting mixture;

wherein, the processing aids are selected from one or more of thermoplastic polyurethane, polypropylene, polyethylene, polylactic acid, polyvinyl chloride, polyamide, polyvinyl alcohol, polyethylene glycol, polystyrene, poly (butyleneadipate-co-terephthalate), poly (methyl methacrylate), polyethylene terephthalate, polybutylene terephthalate, and paraffin;

wherein, the forming comprises extrusion or one or more of pressing, stretching, calendering, and expanding after extrusion;

wherein, an extrudate after extrusion can be a tube, a membrane, or a sheet.

In some embodiments of the present invention, the process further comprises a post-processing step after forming;

wherein, the post-processing is selected from at least one of microporization, heat treatment, and surface treatment;

wherein, the microporization is selected from solvent treatment, high-temperature ablation, and phase separation;

a temperature for the heat treatment is not lower than 200° C.;

the surface treatment is selected from plasma treatment, naphthalene sodium treatment, chemical plating, and electroplating.

In some embodiments of the present invention, the solvent treatment comprises soaking and/or washing with a solvent, followed by drying; wherein the soaking lasts for a duration of 100-150 minutes;

wherein the solvent is selected from one or more of water, chloroform, N,N-dimethylformamide, dimethyl sulfoxide, xylene, methanol, ethanol, dichloromethane, acetone, and carbon tetrachloride.

In some embodiments of the present invention, the solvent treatment includes soaking in a solvent and continuing with the solvent washing, followed by drying after washing; wherein, the soaking lasting for 100-150 minutes.

For instance, in some embodiments, the washing can be carried out using a Soxhlet extractor.

In some embodiments of the present invention, the high-temperature ablation is performed at a temperature higher than the volatilization temperature or decomposition temperature of the processing aid.

wherein, the temperature of the high-temperature ablation is at least 50° C. higher than the volatilization or decomposition temperature of the processing aid, and the high-temperature ablation lasting for more than 30 minutes.

In some embodiments, after high-temperature ablation, washing should be performed after cooling. Wherein, the solvent used for washing is selected from one or more of water, chloroform, N,N-dimethylformamide, dimethyl sulfoxide, xylene, methanol, ethanol, dichloromethane, acetone, and carbon tetrachloride, preferably water and/or ethanol.

In some embodiments of the present invention, the PTFE has a molecular weight of greater than 1 million or greater than $10^7$ g/mol.

The PTFE described in the present invention can be in a form of powder, chunks, or emulsion.

Particularly, in some embodiments, the PTFE has a molecular weight higher than $10^7$ g/mol, a crystallinity of 60-95%, and exhibits stronger fibrous capabilities under external forces.

In the present invention, the PTFE can be used as raw material after crushing or sieving to select appropriate sizes, or the PTFE can also be modified. For example, in some embodiments of the present invention, PTFE particles can be coated with polymethyl methacrylate (PMMA), polystyrene (PS), or styrene-acrylonitrile copolymer (SAN). Such treatment can prevent PTFE aggregation and improve its compatibility with processing aids.

In some embodiments of the present invention, the PTFE constitutes 1-50 wt % of the total amount of the raw materials, and the processing aids constitute 50-99 wt % of the total amount of the raw materials. Preferably, the PTFE constitutes 5-50 wt % of the total amount of the raw materials, while the processing aids constitutes 50-95 wt % of the total amount of the raw materials. For example, in some embodiments, the mass ratios of PTFE to processing aids can be 0.5:95, 1:9, 2:8, 2:6.5, 2:6, 3:7, 3:6.5, 3:6, 4:6, and so forth.

In some embodiments of the present invention, the melt blending use a blending equipment selected from a single screw extruder, twin-screw extruder, open mill, internal mixer, blender, and roll mill;

In the embodiments of the present invention, the temperature for melt blending is set according to the temperature of the processing aids. When in a blending equipment, the temperature during melt blending is the processing temperature of the raw materials in the blending equipment. In some embodiments of the present invention, the temperature for melt blending is adjusted within the range of 5-100° C. above the melting temperature of the processing aids, preferably within the range of 5-80° C.

In some embodiments of the present invention, the pressure during the melt blending is 5-30 MPa, the rotation speed is 10-100 rpm, and the melt blending lasting for 3 to 180 minutes. By controlling the temperature and pressure, the shear strength during the melt blending is adjusted to achieve the fibrous structure of PTFE.

For example, in some embodiments of the present invention, when the processing aids are polylactic acid (PLA), polymethyl methacrylate (PMMA), or polyvinyl alcohol (PVA), the temperature during the melt blending can be within the range of 140-240° C., preferable of 160-240° C., and further preferable of 160-200° C.

In some embodiments of the present invention, extruding after melt blending the raw materials, followed by hot pressing at a temperature below 370° C., or machining at a temperature below 50° C., or stretching to obtain a blended membrane; wherein, the thickness of the blended membrane is 0.02-2 mm.

In some embodiments of the present invention, hot pressing can be done by molding or rolling, and stretching can be achieved through uniaxial/biaxial stretching or expansion equipment.

In some embodiments of the present invention, drying the raw materials before melt blending, with a drying temperature of 30-200° C. and a drying time of 1-12 hours; drying methods include natural drying, vacuum drying, or air-drying.

In some other embodiments of the present invention, the raw materials may also contain functional additives, wherein the functional additives are selected from modifiers and fillers; wherein the modifiers are selected from one or more of porogens, antibacterial agents, foaming agents, antistatic agents, flame retardants, plasticizers, heat stabilizers, antioxidants, light stabilizers, mold inhibitors, colorants, whitening agents, fillers, coupling agents, lubricants, and mold release agents; the fillers are selected from one or more of thermal conductive fillers, electrically conductive fillers, fiber fillers, wear-resistant fillers, and color-changing fillers.

For instance, the conductive fillers may include one or more of carbon black, carbon fibers, carbon nanotubes, graphene, metal powders, metal fibers, and two-dimensional Mxene (transition metal carbides and/or nitrides). For example, the thermal conductive fillers may include one or more of boron nitride, graphite, and metal oxides. For example, the color-changing fillers include pigments and fluorescent agents.

In some embodiments of the present invention, the functional additives account for 0-50 wt % of the total amount of the raw material, preferably 0-30 wt %.

Specifically, the process of the present invention can be used to prepare PTFE membranes or PTFE microporous membranes, as well as functionalized PTFE microporous membranes.

Process for Preparing PTFE Membrane

In some embodiments of the present invention, the process for preparing PTFE-based materials comprises using PTFE and processing aids as raw materials, melt blending the raw materials, extruding, and pressing to obtain a blended membrane.

For example, in some embodiments, the process includes drying the raw materials before feeding into the blending equipment for melt blending to obtain a blended product; wherein, the melt blending is conducted at a temperature adjusted within the range of 5-80° C. above the melting temperature of the processing aids, with a rotation speed of 10-100 rpm, and the melt blending duration lasting for 3-180 minutes;

extruding the blended product, then conducting hot pressing at a temperature below 370° C. to achieve a blended membrane with a thickness of 0.02-2 mm, followed by cooling to room temperature. Cooling can be achieved by liquid cooling, air cooling, or natural cooling.

In these embodiments, the pressure during melt blending is 5-30 MPa, for example, the pressure can be 7 MPa, 13 MPa, 15 MPa, etc.

In these embodiments, the processing aids are thermoplastic polymers, which can flow and have certain strength under certain conditions such as temperature, concentration, and pressure. Examples of thermoplastic polymers include thermoplastic polyurethane, polypropylene, polyethylene, polylactic acid, polyvinyl chloride, polyamide, polyvinyl alcohol, polyethylene glycol, polystyrene, poly (butyleneadipate-co-terephthalate), poly (methyl methacrylate), polyethylene terephthalate, polybutylene terephthalate, etc. Particularly, in some embodiments of the present invention, the thermoplastic polymer is polylactic acid or polyvinyl alcohol.

Process for Preparing PTFE Microporous Membrane Material

In some embodiments of the present invention, the process for preparing PTFE porous membrane material includes using PTFE and processing aids as raw materials, melt blending the raw materials, extruding, and pressing to obtain a blended membrane, followed by microporous treatment of the blended membrane to obtain a microporous membrane.

For example, in some embodiments, the process includes drying the raw materials before feeding into the blending equipment for melt blending to obtain a blended product; wherein, the melt blending is conducted at a temperature adjusted within the range of 5-80° C. above the melting temperature of the processing aids, and the melt blending duration lasting for 3-180 minutes;

extruding the blended product, then conducting hot pressing at a temperature below 370° C. to achieve a blended membrane with a thickness of 0.02-2 mm, followed by cooling to room temperature or maintaining the blended membrane under the temperature of the hot pressing for more than 30 minutes before cooling to room temperature;

then soaking in a solvent for 100-150 minutes, followed by washing with the solvent after removal, or washing directly with the solvent without prior soaking, and after washing, drying to obtain a microporous membrane.

In these embodiments, the pressure during melt blending is 5-30 MPa, for example, the pressure can be 7 MPa, 13 MPa, 15 MPa, etc.

In these embodiments, the processing aids are thermoplastic polymers, which can flow and have certain strength under certain conditions such as temperature, concentration, and pressure. Examples of thermoplastic polymers include thermoplastic polyurethane, polypropylene, polyethylene, polylactic acid, polyvinyl chloride, polyamide, polyvinyl alcohol, polyethylene glycol, polystyrene, poly (butyleneadipate-co-terephthalate), poly (methyl methacrylate), polyethylene terephthalate, polybutylene terephthalate, etc. Particularly, in some embodiments of the present invention, the thermoplastic polymer is polylactic acid or polyvinyl alcohol.

In some embodiments of the present invention, the process for preparing PTFE porous membrane material includes using PTFE and processing aids as raw materials, melt blending the raw materials, extruding, and pressing to obtain a blended membrane, followed by microporous treatment of the blended membrane to obtain a microporous membrane, and then subjecting the microporous membrane to heat treatment at a temperature below 370° C.

For instance, in other embodiments, the process includes: drying the raw materials before feeding into a blending equipment for melt blending to obtain a blended product; wherein, the melt blending is conducted at a temperature adjusted within the range of 5-100° C. above the melting temperature of the processing aids, with a pressure for the melt blending set at 5-30 MPa, and the melt blending duration lasting for 3-180 minutes;

extruding the blended product, then conducting hot pressing at a temperature below 370° C. to achieve a blended membrane with a thickness of 0.02-2 mm, followed by cooling to room temperature;

then soaking in a solvent for 100-150 minutes, removing and washing with the solvent, and after washing, removing to dry to obtain a microporous membrane;

then annealing the microporous membrane at a temperature below 370° C., ensuring the membrane is securely held in place with a fixture during the annealing process, followed by cooling to room temperature after annealing.

Alternatively, the process includes drying the raw materials before feeding into a blending equipment for melt blending to obtain a blended product; wherein, the melt blending is conducted at a temperature adjusted within the range of 5-100° C. above the melting temperature of the processing aids, with a pressure for the melt blending set at 5-30 MPa, and the melt blending duration lasting for 3-180 minutes;

extruding the blended product, then conducting hot pressing at a temperature below 370° C. to achieve a blended membrane with a thickness of 0.02-2 mm, maintaining the blended membrane under the temperature of the hot pressing for more than 30 minutes before cooling to room temperature, washing with a solvent, and after washing, removing to dry to obtain a microporous membrane.

In these embodiments, a preferred temperature for annealing is 200-340° C.

In these embodiments, the processing aids are substances that exhibit flowability and viscosity at certain temperatures, such as polypropylene, polyethylene, polylactic acid, polyvinyl chloride, polyamide, polyvinyl alcohol, polyethylene glycol, polystyrene, poly (methyl methacrylate), polyethylene terephthalate, polybutylene terephthalate, paraffin, etc. Specifically, in some embodiments, the processing aids are polylactic acid or polymethyl methacrylate.

For example, in another set of embodiments, the process includes using PTFE and processing aids as raw materials, melt blending the raw materials, extruding, and pressing to obtain a blended membrane, and subjecting the blended membrane to solvent treatment, and then performing surface treatment.

For instance, in another set of embodiments, the process includes: drying the raw materials before feeding into a blending equipment for melt blending to obtain a blended product; wherein, the melt blending is conducted at a temperature adjusted within the range of 5-100° C. above the melting temperature of the processing aids, with a pressure for the melt blending set at 5-30 MPa, and the melt blending duration lasting for 3-180 minutes;

extruding the blended product, then conducting hot pressing at a temperature below 370° C. to achieve a blended membrane with a thickness of 0.02-2 mm, followed by cooling to room temperature;

then soaking in a solvent for 100-150 minutes, removing to dry and washing with the solvent, and after washing, removing to dry again to obtain a microporous membrane;

then subjecting the microporous membrane to plasma treatment.

Alternatively, the process includes using PTFE and processing aids as raw materials, melt blending the raw materials, extruding, and pressing to obtain a blended membrane, and subjecting the blended membrane to solvent treatment, and then performing surface treatment.

For instance, in some alternative embodiments, the process includes: drying the raw materials before feeding into a blending equipment for melt blending to obtain a blended product; wherein, the melt blending is conducted at a temperature adjusted within the range of 5-100° C. above the melting temperature of the processing aids, with a pressure for the melt blending set at 5-30 MPa, and the melt blending duration lasting for 3-180 minutes;

extruding the blended product, then conducting hot pressing at a temperature below 370° C. to achieve a blended membrane with a thickness of 0.02-2 mm, maintaining the blended membrane under the temperature of the hot pressing for more than 30 minutes before cooling to room temperature, washing with a solvent, and after washing, removing to dry to obtain a microporous membrane; and then subjecting the microporous membrane to plasma treatment.

The plasma treatment, for example, can be conducted using a plasma surface treatment apparatus. The microporous membrane is placed inside the plasma surface treatment apparatus, and after vacuum evacuation, oxygen is introduced. The microporous membrane is then subjected to oxygen plasma treatment for a certain period, such as 90 seconds, before being removed. This treatment can enhance the surface properties of the material, such as significantly improving hydrophilicity.

Process for Preparing Functionalized PTFE Microporous Membrane Materials

In some embodiments of the present invention, the process for preparing PTFE microporous membrane materials as described herein allows for the direct in-situ functional modification of the PTFE microporous membrane materials when functional additives are included in the raw materials.

Wherein, the functional additives are selected from modifiers and performance-enhancing fillers, wherein the modifiers are selected from one or more of porogens, antibacterial agents, foaming agents, antistatic agents, flame retardants, plasticizers, heat stabilizers, antioxidants, light stabilizers, mold inhibitors, colorants, whitening agents, fillers, coupling agents, lubricants, and mold release agents; the fillers are selected from one or more of thermal conductive fillers, electrically conductive fillers, fiber fillers, wear-resistant fillers, and color-changing fillers;

For instance, the conductive fillers may include one or more of carbon black, carbon fibers, carbon nanotubes, graphene, metal powders, metal fibers, and two-dimensional Mxene (transition metal carbides and/or nitrides). For example, the thermal conductive fillers may include one or more of boron nitride, graphite, and metal oxides. For example, the color-changing fillers include pigments and fluorescent agents.

In some embodiments of the present invention, the functional additives account for 0-50 wt % of the total amount of the raw material, preferably 0-30 wt %. For instance, in some embodiments, the mass ratio of PTFE, processing aids, and functional additives can be 3:6.5:0.5, 3:6:1, 2:6:2, etc.

For example, in some embodiments of the present invention, PTFE, processing aids, and functional additives are directly added into blending equipment for melt blending. After extrusion, the blended product is pressed into a membrane, and residual processing aids are removed via solvent treatment or high-temperature ablation, resulting in a functionalized PTFE microporous membrane material. For instance, in some embodiments, conductive fillers such as carbon nanotubes (CNTs) are added, and the PTFE microporous membranes prepared exhibit electrical conductivity. The conductivity varies based on the mass ratio of PTFE to carbon nanotubes, for example, when the mass ratio of PTFE and carbon nanotubes is 3:0.5, 3:1, 1:1, the conductivity can reach 0.13-850 S/m.

Material Based on PTFE

In a second aspect of the invention, a material based on PTFE is provided, which is prepared by any of the processes described in the first aspect of the present invention.

In embodiments of the present invention, the material based on PTFE can be a PTFE membrane material, a PTFE microporous membrane material, or a functionalized PTFE microporous membrane material.

In some embodiments of the present invention, the material described exhibits good thermal shrinkage properties, achieving free shrinkage when heated to above 200° C. On a microscopic level, nanoscale polytetrafluoroethylene fibers entangle and stack to form a network structure, and the material also possesses good tensile lightness and elongation at break. For example, in some embodiments, the prepared PTFE membrane materials or PTFE microporous membrane materials can have a tensile strength of 23-60 MPa and an elongation at break of 20-108%, with a radial thermal shrinkage rate of 50-67% after heat treatment at 200-240° C. The materials described in the present invention can be used to produce heat-shrinkable products of different macroscopic shapes, such as heat-shrinkable membranes or further processed into heat-shrinkable tubes, etc.

In some embodiments of the present invention, the materials described can not only possess thermal shrinkage properties but also exhibit good breathability, strength, and toughness. For example, in some embodiments, the prepared PTFE microporous membrane materials have an average pore size of about 100-300 nanometers and a porosity of more than 60%. Tensile tests have determined that their tensile strength is about 30-35 MPa, and the elongation at break is greater than 50%.

In some embodiments of the present invention, the materials described can also be functionalized materials, for instance, by introducing different functional fillers or modifiers to achieve various functionalities of the material.

Heat-Shrinkable Material Based on PTFE

In some embodiments of the present invention, a heat-shrinkable material based on PTFE nanofibers is provided, prepared through the following process.

In some embodiments of the present invention, the process includes using PTFE and processing aids as raw materials, melt blending the raw materials, then extruding and pressing to obtain a blended membrane.

Alternatively, in some embodiments of the present invention, the process includes using PTFE and processing aids as raw materials, melt blending the raw materials, then extruding and pressing to obtain a blended membrane, followed by microporization treatment to obtain a microporous membrane.

For example, in some embodiments, the process includes drying the raw materials before feeding into the blending equipment for melt blending to obtain a blended product; wherein, the melt blending is conducted at a temperature adjusted within the range of 5-80° C. above the melting temperature of the processing aids, with a rotation speed of 10-100 rpm, and the melt blending duration lasting for 3-180 minutes;

extruding the blended product, then conducting hot pressing at a temperature below 370° C. to achieve a blended membrane with a thickness of 0.02-2 mm, followed by cooling to room temperature.

Certainly, the heat-shrinkable material can also have a porous structure. For example, in some embodiments, the process includes drying the raw materials before feeding into blending equipment to achieve a blended product, with the blending temperature adjusted to be 5-80° C. above the melting temperature of the processing aids, and the melt blending duration lasting for 3-180 minutes;

soaking the cooled blended membrane in a solvent for 100-150 minutes, drying and washing with the solvent, and after washing, drying again to obtain a microporous membrane; and then soaking in a solvent for 100-150 minutes, removing to dry and washing with the solvent, and after washing, removing to dry again to obtain a microporous membrane.

Alternatively, the process includes drying the raw materials before feeding into a blending equipment for melt blending to obtain a blended product; wherein, the melt blending is conducted at a temperature adjusted within the range of 5-80° C. above the melting temperature of the processing aids, and the melt blending duration lasting for 3-180 minutes;

extruding the blended product, then conducting hot pressing at a temperature below 370° C. to achieve a blended membrane with a thickness of 0.02-2 mm, maintaining the blended membrane under the temperature of the hot pressing for more than 30 minutes before cooling to room temperature, washing with a solvent, and after washing, removing to dry to obtain a microporous membrane.

During the melt blending, the pressure is set at 5-30 MPa, for example, the pressure could be 7 MPa, 13 MPa, 15 MPa, etc.

In these embodiments, the processing aids are thermoplastic polymers, which can flow and have certain strength under certain conditions such as temperature, concentration, and pressure. Examples of thermoplastic polymers include thermoplastic polyurethane, polypropylene, polyethylene, polylactic acid, polyvinyl chloride, polyamide, polyvinyl alcohol, polyethylene glycol, polystyrene, poly (butyleneadipate-co-terephthalate), poly (methyl methacrylate), polyethylene terephthalate, polybutylene terephthalate, etc. Specifically, in these embodiments, the thermoplastic polymers are polylactic acid or polyvinyl alcohol.

PTFE, due to its unique crystal structure and surface properties, tends to fibrillate under certain temperatures and external forces, forming long nanoscale fibers, which can be cooled and set at room temperature. The nanofiber network formed at high temperatures can maintain its fibrous structure at room temperature and tends to shrink back to its initial aggregated state when reheated to high temperatures. The above process of the present invention uses blending extrusion equipment to introduce PTFE into the thermoplastic polymer matrix. By applying strong shear forces to PTFE crystals during blending, it induces intense fibrillation, thereby forming a physically entangled network of PTFE nanofibers during the blending process. Therefore, by utilizing the fibrillation shrinkage characteristic of PTFE and controlling the matrix material and processing techniques during the blending process, the polymer matrix's thermal shrinkage driven by the retraction of PTFE fibers at high temperatures can be achieved. This process has several unique advantages: first, different thermoplastic polymers' thermal shrinkage can be achieved through various material designs, offering high versatility. Second, different heat-shrinkable products of various macroscopic shapes, such as heat-shrinkable membranes and tubes, can be directly produced through different extrusion processes. Third, the heat-shrinkable materials produced by this process can be recycled and reprocessed, benefiting resource and environmental protection. Fourth, based on actual needs, heat-shrinkable materials with a porous structure can be manufactured through specific post-processing techniques like etching and ablation, thereby achieving breathable heat-shrinkable materials. Fifth, this process is concise, with a green and environmentally friendly processing approach, low equipment investment, and easy implementation for large-scale industrial production.

PTFE Microporous Membrane Material

In some embodiments of the present invention, a PTFE microporous membrane material is provided, prepared through the following process.

In some embodiments of the present invention, the process includes using PTFE and processing aids as raw materials, melt blending the raw materials, extruding, and pressing to obtain a blended membrane, followed by microporization treatment to obtain a microporous membrane, and then subjecting the microporous membrane to heat treatment at a temperature below 370° C.

For instance, in some embodiments, the process includes: drying the raw materials before feeding into a blending equipment for melt blending to obtain a blended product; wherein, the melt blending is conducted at a temperature adjusted within the range of 5-100° C. above the melting temperature of the processing aids, with a pressure for the melt blending set at 5-30 MPa, and the melt blending lasts for 3-180 minutes;

extruding the blended product, then conducting hot pressing at a temperature below 370° C. to achieve a blended membrane with a thickness of 0.02-2 mm, followed by cooling to room temperature or maintaining the blended membrane under the temperature of the hot pressing for more than 30 minutes before cooling to room temperature;

then soaking in a solvent for 100-150 minutes, followed by washing with the solvent after removal, or washing directly with the solvent without prior soaking, and after washing, drying to obtain a microporous membrane;

then annealing the microporous membrane at a temperature below 370° C., ensuring the membrane is securely held in place with a fixture during the annealing process, followed by cooling to room temperature after annealing. Preferably, temperature for annealing is 200-340° C.

In these embodiments, the processing aids are substances that exhibit flowability and viscosity at certain temperatures, such as polypropylene, polyethylene, polylactic acid, polyvinyl chloride, polyamide, polyvinyl alcohol, polyethylene glycol, polystyrene, poly (methyl methacrylate), polyethylene terephthalate, polybutylene terephthalate, paraffin, etc. Specifically, in some embodiments, the processing aids are polylactic acid or polymethyl methacrylate.

For example, in another set of embodiments, the process includes using PTFE and processing aids as raw materials, melt blending the raw materials, extruding, and pressing to obtain a blended membrane, and subjecting the blended membrane to solvent treatment, and then performing surface treatment.

For instance, in another set of embodiments, the process includes: drying the raw materials before feeding into a blending equipment for melt blending to obtain a blended product; wherein, the melt blending is conducted at a temperature adjusted within the range of 5-100° C. above the melting temperature of the processing aids, with a pressure for the melt blending set at 5-30 MPa, and the melt blending duration lasting for 3-180 minutes;

extruding the blended product, then conducting hot pressing at a temperature below 370° C. to achieve a blended membrane with a thickness of 0.02-2 mm, followed by cooling to room temperature or maintaining the blended membrane under the temperature of the hot pressing for more than 30 minutes before cooling to room temperature;

then soaking in a solvent for 100-150 minutes, followed by washing with the solvent after removal, or washing directly with the solvent without prior soaking, and after washing, drying to obtain a microporous membrane;

then subjecting the microporous membrane to plasma treatment. Plasma treatment can improve the surface properties of materials, for example, microporous membranes treated with oxygen plasma can have significantly improved hydrophilicity.

The aforementioned process utilizes blending equipment to directly mix PTFE and processing aids, and processes them into a membrane. During the blending, PTFE fibrillates under the strong shear action, forming an intertwined network of fibers. After the removal of processing aids from the obtained membrane, a microporous membrane is formed with interlaced and stacked PTFE fibers. The advantages of the mentioned process are as follows: Firstly, PTFE microporous membranes can be obtained through simple blending, membrane forming, and post-processing, with equipment that is convenient and flexible, eliminating the need for complex processing techniques and costly processing equipment, resulting in low costs, high production efficiency, and suitability for large-scale industrial production. Secondly, the PTFE microporous membranes produced by this process feature finely detailed fibers, high porosity, small pore sizes, uniform morphology, and possess high strength and toughness.

Functionalized PTFE Microporous Membrane Material

In some embodiments of the present invention, a functionalized PTFE microporous membrane material is provided, prepared through the following process.

The preparation method for this type of material is essentially the same as the aforementioned process for producing PTFE microporous membrane materials, allowing for the in-situ functionalization of the PTFE microporous membrane materials during their preparation.

In some embodiments of the present invention, the process involves adding functional additives to the raw materials while preparing the PTFE microporous membrane materials. Wherein, the functional additives are selected from modifiers and performance-enhancing fillers, wherein the modifiers are selected from one or more of porogens, antibacterial agents, foaming agents, antistatic agents, flame retardants, plasticizers, heat stabilizers, antioxidants, light stabilizers, mold inhibitors, colorants, whitening agents, fillers, coupling agents, lubricants, and mold release agents; the fillers are selected from one or more of thermal conductive fillers, electrically conductive fillers, fiber fillers, wear-resistant fillers, and color-changing fillers;

For instance, the conductive fillers may include one or more of carbon black, carbon fibers, carbon nanotubes, graphene, metal powders, metal fibers, and two-dimensional Mxene (transition metal carbides and/or nitrides). For example, the thermal conductive fillers may include one or more of boron nitride, graphite, and metal oxides. For example, the color-changing fillers include pigments and fluorescent agents.

In some embodiments of the present invention, the functional additives should not exceed 50 wt % of the total amount of raw materials, preferably not exceeding 30 wt %. For instance, in some embodiments, the mass ratio of PTFE, processing aids, and functional additives can be 3:6.5:0.5, 3:6:1, 2:6:2, etc.

For example, in some embodiments, PTFE, processing aids, and functional additives are directly added into blending equipment for melt blending. After extrusion, the blended product is pressed into a membrane, and residual processing aids are removed via solvent treatment or high-temperature ablation, resulting in a functionalized PTFE microporous membrane material. For instance, in some embodiments, by adding conductive fillers such as carbon nanotubes (CNTs), PTFE microporous membranes with conductive properties can be obtained, and their conductivity can be adjusted by controlling the ratio of PTFE to conductive fillers.

The aforementioned process uses blending equipment to directly mix PTFE, processing aids, and functional additives into a membrane. During blending, PTFE fibrillates under strong shear forces, forming an interwoven network of fibers. After removing the processing aids from the obtained membrane, a microporous membrane formed by interlaced and stacked PTFE fibers is achieved, along with in-situ modification. The advantages of the mentioned process are as follows: Firstly, PTFE microporous membranes can be obtained through simple blending, membrane forming, and post-processing, with equipment that is convenient and flexible, eliminating the need for complex processing techniques and costly processing equipment, resulting in low costs, high production efficiency, and suitability for large-scale industrial production. Secondly, the PTFE microporous membranes produced by this process feature finely detailed fibers, high porosity, small pore sizes, uniform morphology, and possess high strength and toughness. Thirdly, functional additives can be added during the blending process for in-situ modification to obtain functionalized PTFE microporous membranes, avoiding complex surface modification processes required for post-functionalization.

The specific technical features described in the various embodiments across the aspects of the present invention can be combined in any suitable manner without contradiction and in accordance with the technical solution of the present invention. To avoid unnecessary repetition, the invention does not further specify various possible combinations.

Unless specifically stated, the numerical ranges mentioned in the present invention include all values within this range and any range constituted by any two values within this range. For example, the pressure during melt blending is 5-30 MPa, which includes all values between 10-15 MPa and any range constituted by any two values (e.g., 7 MPa, 13 MPa) within this range (7-13 MPa); different numerical values of the same indicator in all embodiments of the present invention can be freely combined to form range values, provided they conform to the technical solution of the present invention.

The beneficial effects of the present invention include:

High versatility in preparation process: the process of the present invention is applicable to a variety of thermoplastic polymers, effectively endowing them with one or more properties such as excellent thermal shrinkability, fine microporous structure, high strength, and toughness. This versatility makes the process more widely applicable across different materials.

Simple, economical, and efficient processing: adopting a straightforward blending, membrane forming, and post-processing flow, the present invention is suitable for large-scale industrial production while reducing equipment requirements and increasing production efficiency, effectively solving the issues of complexity and high cost associated with traditional processes.

Environmental friendliness and recyclability: the heat-shrinkable materials prepared by the present invention are thermoplastic, allowing for recycling and reprocessing. This not only benefits resource and environmental protection but also addresses the environmental issues associated with the difficulty of recycling and natural decomposition of traditional cross-linked heat-shrinkable materials.

Multifunctional and customizable material preparation: by adding different modifiers and processing aids, the present invention can produce materials with specific functions, such as breathable materials, conductive materials, and materials with specific surface treatments, to meet diverse application needs.

In-situ modification for functionalized microporous membranes: the process of the present invention achieves in-situ modification of PTFE during the blending process, avoiding complex post-functionalization steps. The process not only ensures the high-performance characteristics of the materials but also significantly enhances production efficiency.

BRIEF DESCRIPTION OF THE DRAWINGS

The accompanying drawings to the specification, which form part of the present application, are used to provide a further understanding of the present application, and the illustrative embodiments of the present application and the description thereof are used to explain the present application and are not unduly limiting the present application. Hereinafter, the embodiments of the present invention are described in detail with reference to the drawings, where.

DETAILED DESCRIPTION OF THE INVENTION

Figure 1:
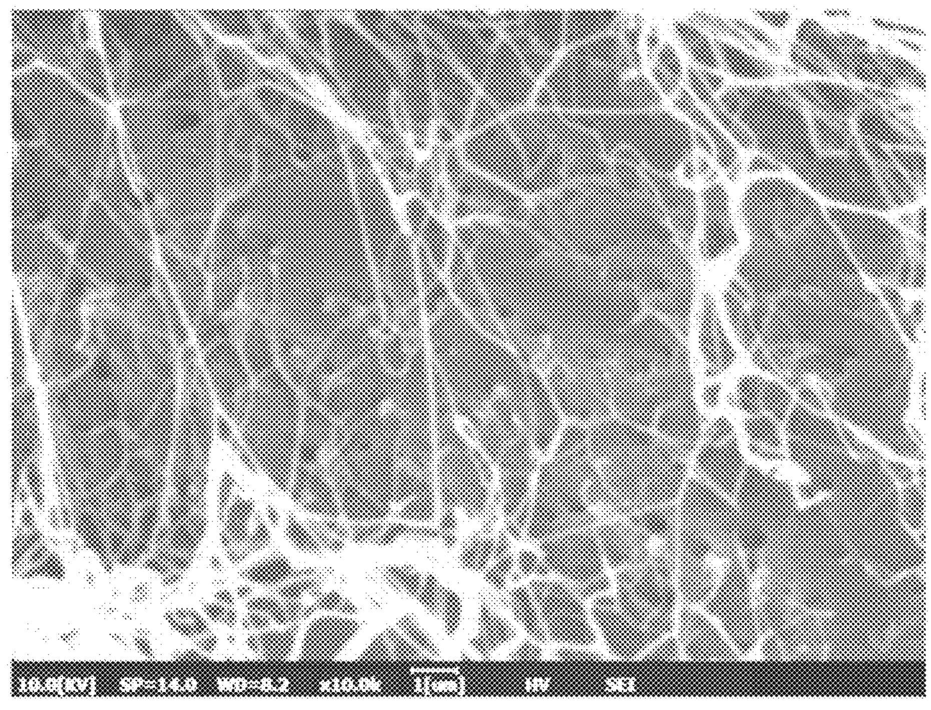
FIG. 1 shows a microscopic structure diagram of the internal nanofibers of the polylactic acid/polytetrafluoroethylene composite heat-shrinkable membrane prepared using the process of the present invention in Example 1.

The present invention is further described below with reference to specific examples. It should be understood that these examples are provided solely for the purpose of illustration and should not be used to limit the scope of the present invention. Experimental methods for which specific conditions are not indicated in the following embodiments generally follow conventional conditions or follow the conditions recommended by the manufacturer.

Unless otherwise defined, all professional and scientific terms used in the text have the same meaning as those familiar to those skilled in the art. Reagents or raw materials used in the present invention are available through conventional means. Unless otherwise specified, reagents or raw materials used in the present invention are used in a conventional manner in the field or in accordance with product specifications. In addition, any methods and materials similar or equivalent to those described herein can be used in the methods of the present invention. The preferred embodiments described herein are exemplary only.

As introduced in the technical background, heat-shrinkable materials manufactured by traditional crosslinking methods are difficult to recycle, cannot produce heat-shrinkable materials with porous structures for breathability, and involve complex product processes. Additionally, traditional thermoplastic polymers, being linear molecular chains, exhibit poor heat shrinkability. Moreover, traditional processing techniques for PTFE microporous membranes are characterized by high investment, complex processes, product anisotropy, relatively low porosity, lower strength, and the need for post-processing.

The present invention proposes a process that creates a nano PTFE fiber network structure within a thermoplastic polymer matrix through melt blending, imparting physical crosslinking to the material and thus enabling good heat shrinkability. The main steps include:

1) drying a certain proportion of PTFE, processing aids, and other raw materials;
2) feeding the dried materials into blending equipment through the feed port for melt blending;
3) processing the molten blend product after extrusion to obtain blended membranes, etc., and cooling to set;
4) optionally, based on actual needs, selecting appropriate methods such as solvent etching, high-temperature ablation, or phase separation to create a porous structure within the product.

Furthermore, the present invention also proposes a method that leverages shear-induced fibrillation, through direct melt blending and membrane formation, to prepare PTFE microporous membranes and their in-situ functional modification. The main steps include:

1) after adjusting the extrusion and pressing equipment to a certain temperature, simultaneously introduce PTFE raw materials, processing aids, and functional additives (optional) into the feed port for blending;
2) after blending, the obtained molten blend or paste is processed into a blended membrane at a certain temperature through methods such as pressing, stretching, or cutting;
3) the blended membrane is then washed with a solvent or subjected to high-temperature treatment to remove processing aids, followed by annealing, to obtain a PTFE microporous membrane.

Example 1

Using polylactic acid (PLA) as the polymer matrix and polytetrafluoroethylene as the second phase, a heat-shrinkable polylactic acid/polytetrafluoroethylene composite membrane was prepared via a twin-screw extrusion process. The raw materials were polylactic acid produced by Natureworks and polytetrafluoroethylene powder produced by Mitsubishi Chemical Corporation. The blending equipment used was a mini twin-screw extruder.

In the first step, all raw materials were placed in a vacuum drying oven and dried at 80° C. for 6 hours.

In the second step, polylactic acid raw material pellets, making up 95% of the mass, and 5% polytetrafluoroethylene powder were fed into the feed port of the twin-screw extruder. The extruder temperatures were set at 160° C., 180° C., and 180° C., with a screw speed of 50 rpm. The chamber pressure was controlled at around 7 MPa, and the cycle time was 10 minutes.

In the third step, extruding the blended product and transferring to a hot press (with the hot press temperature set at 200° C.), and then pressing into a membrane of 0.05 mm thickness. Upon removal, the membrane was placed immediately in cold water to cool to room temperature.

In the fourth step, the membrane was cut into squares with a side length of 5.5 cm and reheated to 200° C. to allow it to freely shrink.

Figure 2:
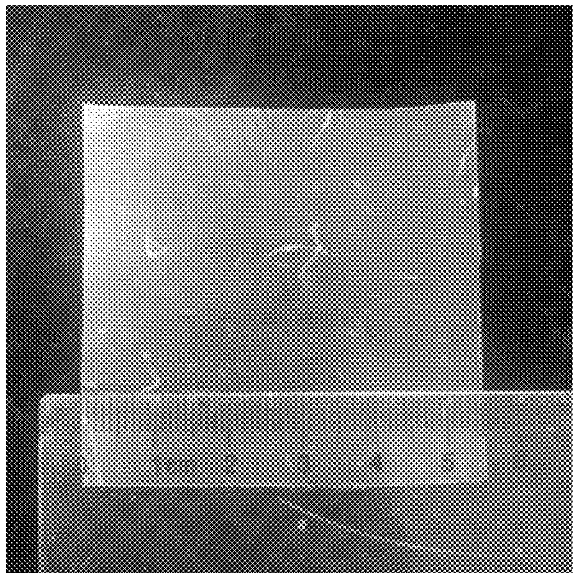
FIG. 2 presents real-shot photos of the polylactic acid/polytetrafluoroethylene composite heat-shrinkable membrane before and after shrinkage, prepared using the process of the present invention in Example 1.
Figure 2:
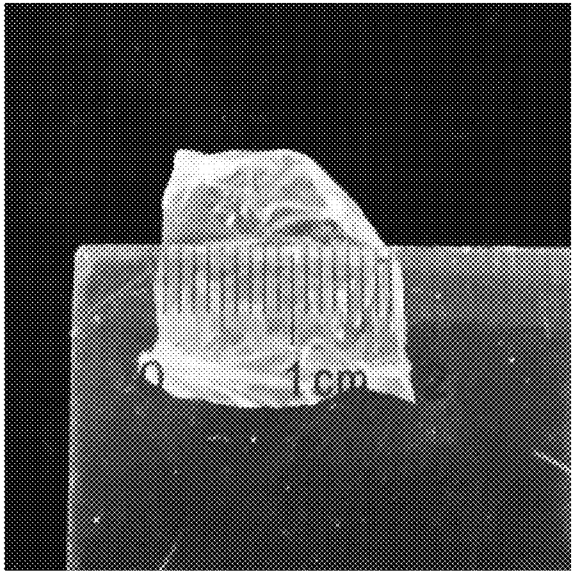

In this example, the obtained heat-shrinkable polylactic acid/polytetrafluoroethylene composite material exhibited a microscopic structure as shown in FIG. 1, where polytetrafluoroethylene fibers at the nanoscale entangled and stacked to form a network structure. The appearance and dimensions of the membrane before and after heat shrinkage are illustrated in FIG. 2. Upon testing, the membrane exhibited a tensile strength of approximately 60 MPa, an elongation at break of about 20%, and a radial thermal shrinkage rate of about 67%.

Example 2

Using polylactic acid as the thermoplastic polymer and dichloromethane as the etching solvent, an example of preparing a heat-shrinkable polytetrafluoroethylene porous membrane through a twin-screw extrusion process and a solvent dissolution etching process is described. The raw materials were polylactic acid produced by Natureworks and polytetrafluoroethylene powder produced by Mitsubishi Chemical Corporation, with the blending equipment being a mini twin-screw extruder.

In the first step, all raw materials were placed in a vacuum drying oven and dried at 80° C. for 6 hours.

In the second step, polylactic acid raw material pellets, making up 70% of the mass, and 30% polytetrafluoroethylene powder were fed into the feed port of the twin-screw extruder. The extruder temperatures were set at 160° C., 180° C., and 180° C., with a screw speed of 50 rpm. The chamber pressure was controlled at around 13 MPa, and the cycle time was 10 minutes.

The third step involved transferring the extruded blend product to a hot press, with the hot press temperature set at 200° C. The blend was pressed into membranes with a thickness of 0.05 mm and a diameter of approximately 7 cm, which were then immediately cooled to room temperature in cold water.

In the fourth step, the membranes were soaked in analytical pure dichloromethane for dissolution. The solvent temperature was at room temperature, with a soaking time of 120 minutes. Afterward, the membranes were dried and subjected to repeated washing and dissolution in dichloromethane using a Soxhlet extractor for an additional 8 hours.

The fifth step involved drying the membrane material and then reheating it to 200° C. to allow it to freely shrink.

Figure 3:
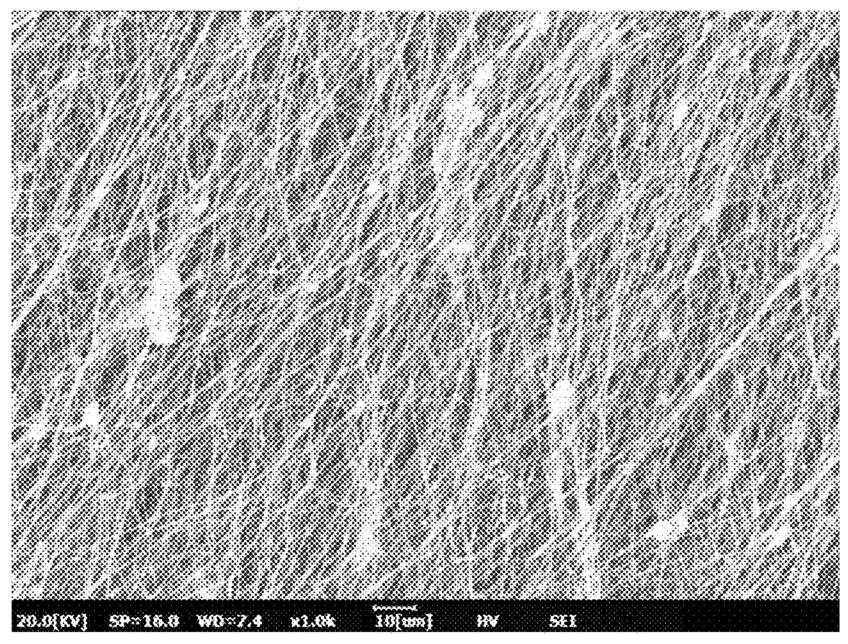
FIG. 3 illustrates a microscopic structure diagram of the internal nanofibers of the porous polytetrafluoroethylene heat-shrinkable membrane prepared using the process of the present invention in Example 2.
Figure 4:
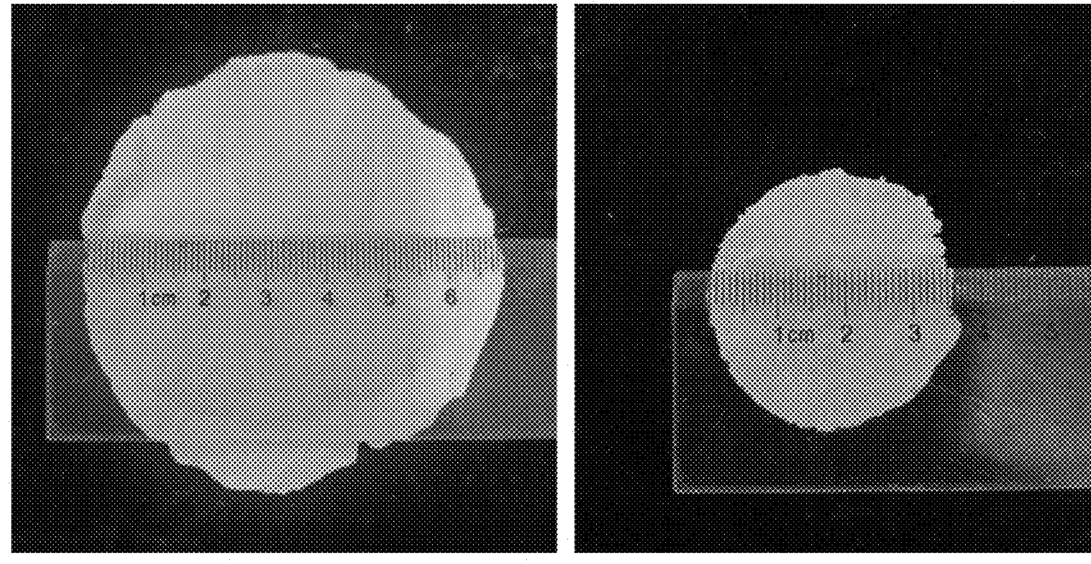
FIG. 4 shows real-shot photos of the porous polytetrafluoroethylene heat-shrinkable membrane before and after shrinkage, prepared using the process of the present invention in Example 2.

In this example, the microscopic structure of the obtained heat-shrinkable polytetrafluoroethylene porous membrane, as shown in FIG. 3, displays a network structure formed by entangled and stacked polytetrafluoroethylene nanofibers. The appearance and dimensions of the membrane before and after heat shrinkage are illustrated in FIG. 4. Upon testing, the membrane exhibited a tensile strength of approximately 23 MPa, an elongation at break of about 106%, and a radial thermal shrinkage rate of about 50%.

Example 3

Using polyvinyl alcohol (PVA) as the thermoplastic polymer and employing a twin-screw extrusion process along with a high-temperature ablation process, an example is provided for preparing a heat-shrinkable polytetrafluoroethylene porous membrane. The raw materials include polyvinyl alcohol produced by Changchun Chemical and polytetrafluoroethylene powder manufactured by Mitsubishi Chemical Corporation, with a mini twin-screw extruder used for blending.

In the first step, all raw materials were placed in a vacuum drying oven and dried at 70° C. for 4 hours.

In the second step, PVA raw material pellets, making up 70% of the mass, and 30% polytetrafluoroethylene powder were fed into the feed port of the twin-screw extruder. The extruder temperatures were set at 170° C., 190° C., and 190° C., with a screw speed of 50 rpm. The chamber pressure was controlled at around 15 MPa, and the cycle time was 10 minutes.

In the third step, extruding the blended product and transferring to a hot press (with the hot press temperature set at 240° C.), and then pressing into a membrane of 0.2 mm thickness, the membrane was maintained under heat for 60 minutes to induce thermal decomposition of the polyvinyl alcohol.

In the fourth step, the hot-pressed membrane was taken out and cooled, then washed three times with ethanol and water before drying.

In the fourth step, the membrane was cut into squares with a side length of 4.5 cm and reheated to 240° C. to allow it to freely shrink.

Figure 5:
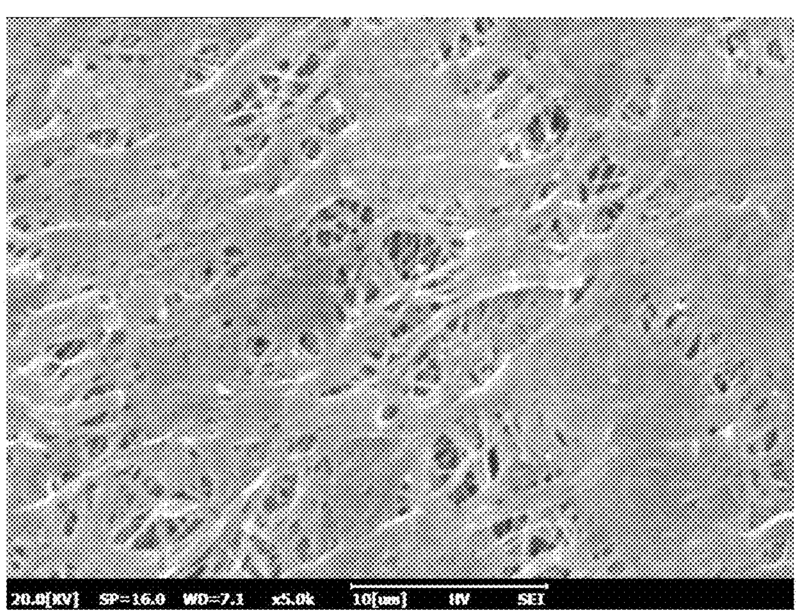
FIG. 5 is a microscopic structure diagram of the heat-shrinkable polytetrafluoroethylene composite material prepared using the process of the present invention in Example 3.
Figure 6:
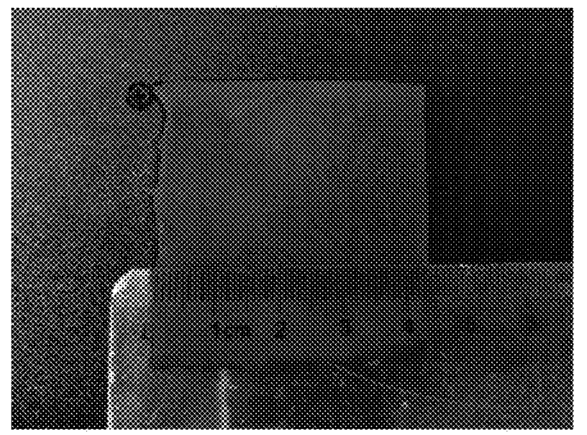
FIG. 6 displays real-shot photos of the appearance and dimensions of the membrane before and after thermal shrinkage, prepared using the process of the present invention in Example 3.
Figure 6:

In this example, the microscopic structure of the obtained heat-shrinkable polytetrafluoroethylene composite material, as shown in FIG. 5, displays a network structure formed by polytetrafluoroethylene fibers after high-temperature ablation and washing. The appearance and dimensions of the membrane before and after heat shrinkage are illustrated in FIG. 6. Upon testing, the membrane exhibited a tensile strength of approximately 23 MPa, an elongation at break of about 108%, and a radial thermal shrinkage rate of about 62%.

Example 4

For an example using polylactic acid (PLA) as a processing aid blended with PTFE powder to prepare PTFE microporous membrane, the materials included PLA pellets produced by Natureworks and PTFE powder produced by Mitsubishi Chemical Corporation. The PLA and PTFE materials were dried prior to the experiment. The blending equipment used was a twin-screw extruder, the membrane-forming equipment was a hot press, the washing reagent was dichloromethane, and the annealing equipment was a high-temperature tube furnace.

The first step involved preheating the twin-screw extruder and hot press to 180° C.

In the second step, after preheating, the screw began rotating, and PTFE powder and PLA pellets with mass ratios of 0.5:9.5, 2:8, and 4:6 were poured into the feed port for blending. The blended product circulated inside the screw for 10 minutes, with the screw pressure controlled between 10 to 15 MPa.

In the third step, once the cycle ended, the blended product was extruded and transferred to the hot press, pressed into a membrane with a thickness of 0.2 mm, and then cooled and set.

In the fourth step, the membrane was then cut into circular membranes with a diameter of approximately 5 cm and soaked in 200 mL of dichloromethane solvent for 6 hours to dissolve the PLA phase within the membrane. The membrane is then subjected to repeated washing using a Soxhlet extractor to thoroughly remove any residual PLA. After the washing process is completed, the PTFE membrane is removed, placed on a glass plate to dry naturally, and then detached.

The fifth step: the PTFE membrane was fixed in a fixture and placed in a tube furnace for annealing at a set temperature of 340° C. for 15 minutes. After annealing, the PTFE microporous membrane was naturally cooled to room temperature.

Figure 7:
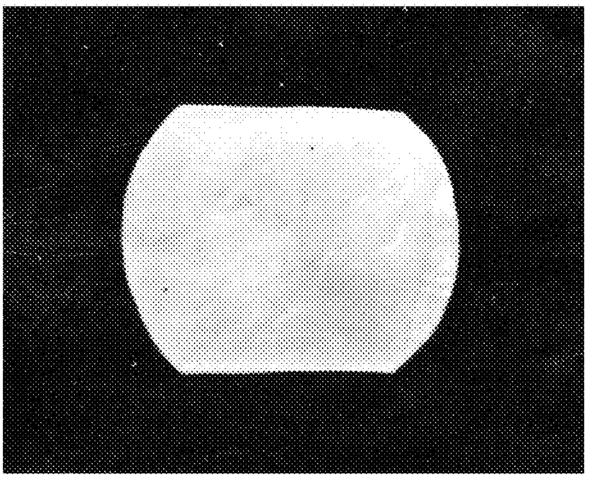
FIG. 7 presents real-shot photos of the PTFE microporous membrane samples prepared in Example 4.
Figure 8:
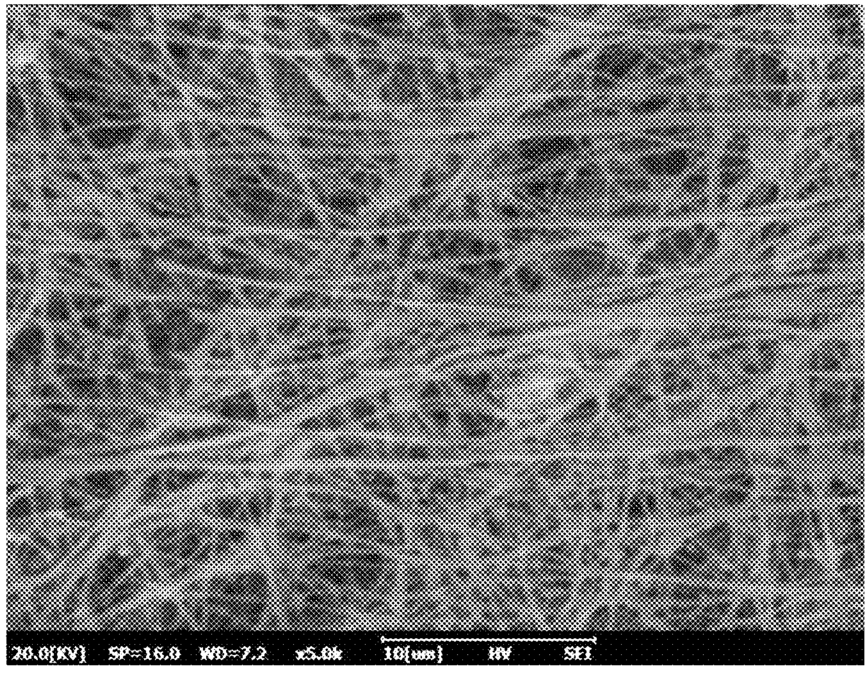
FIG. 8 shows a microscopic electron microscope image of the PTFE microporous membrane prepared in Example 4.

In this example, the PTFE microporous membrane obtained, as shown in FIG. 7, exhibits a smooth and flat surface with a uniform morphology. Depending on the ratio of PTFE to PLA used, the thicknesses of the membranes are approximately 2 μm, 12 μm, and 30 μm, respectively. The internal structure, depicted in FIG. 8, features densely packed PTFE fibers with diameters ranging from approximately 100 to 200 nanometers. Capillary flow porometry measurements indicated an average pore size of about 100 to 300 nm and a porosity exceeding 60%. Tensile tests have determined that their tensile strength is about 30-35 MPa, and the elongation at break is greater than 50%.

Example 5

Using carbon nanotubes (CNT) as the conductive filler, polymethyl methacrylate (PMMA) as the processing aid, and PTFE powder as the base material, an example of preparing a PTFE conductive microporous membrane was provided. The raw materials include PMMA pellets produced by Chi Mei Corporation, CNT powder produced by the Chinese Academy of Sciences, and PTFE powder produced by Mitsubishi Chemical Corporation. After drying the PMMA pellets, PTFE powder, and CNT powder, the experiment was conducted. The blending equipment was a twin-screw extruder and the membrane formation equipment was a roll press, and the etching solvent was N,N-Dimethylformamide (DMF).

In the first step, PTFE powder, CNT powder, and PMMA pellets in mass ratios of 3:0.5:6.5, 3:1:6, and 2:2:6 were poured into a mixing barrel for uniform premixing.

In the second step, the twin-screw extruder and roll press were heated to 180° C. The premixed materials were then loaded into the feed port, and the screws were activated, the blended product underwent a mixing cycle in the screws for 10 minutes, during which the chamber pressure was maintained between 13-15 MPa.

In the third step, after the cycle ended, the extruder die was opened, transferring the blended paste to the roll press equipment for membrane casting, resulting in a blended membrane with a thickness of 0.2 nm.

In the fourth step, the membrane was soaked in a DMF solvent bath for etching to dissolve the PMMA phase within the membrane. Subsequently, a Soxhlet extractor was used to repeatedly wash the membrane to completely remove any residual PMMA. After the washing was completed, the PTFE/CNT membrane was removed, placed on a glass plate to dry naturally, and then taken off.

In the fifth step, the PTFE/CNT membrane was secured in a clamp and annealed using a flat-plate hot press at a temperature of 340° C. for 10 minutes. After annealing, the PTFE/CNT microporous membrane was removed and allowed to cool naturally to room temperature.

Figure 9:
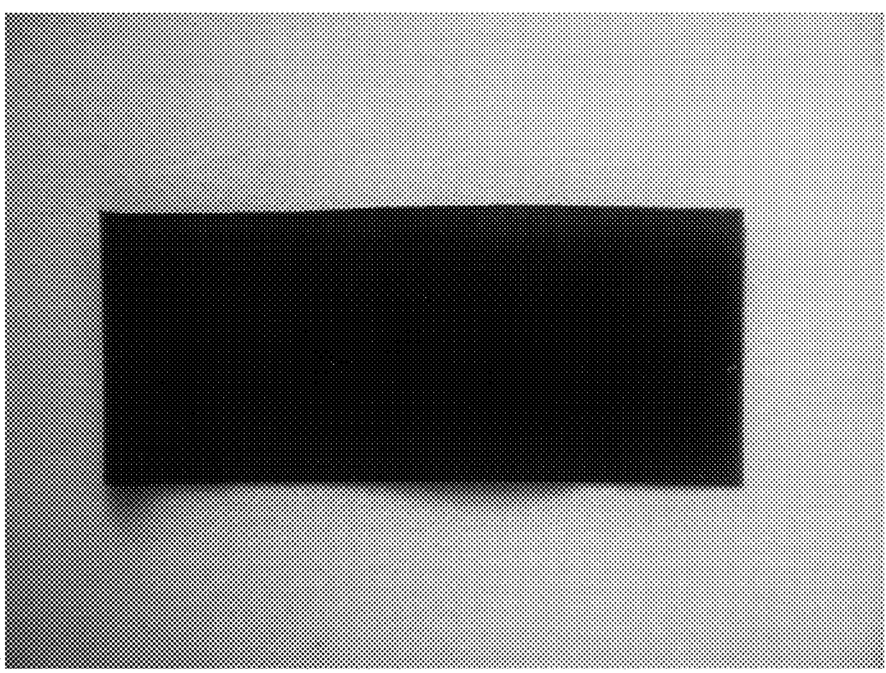
FIG. 9 presents real-shot photos of the PTFE/carbon nanotube conductive porous membrane samples prepared in Example 5.
Figure 10:
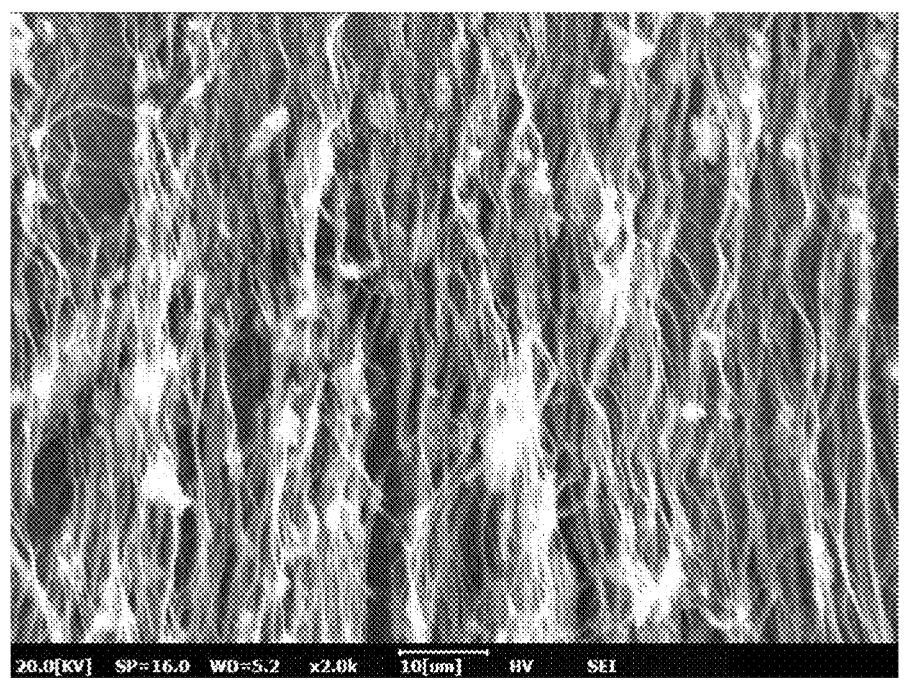
FIG. 10 shows a microscopic electron microscope image of the PTFE/carbon nanotube conductive porous membrane prepared in Example 5.

In this example, the PTFE microporous membrane obtained is shown in FIG. 9, with the membrane surface appearing black, smooth, and uniform. The internal fibrous porous structure, as shown in FIG. 10, features densely packed PTFE fibers with CNTs distributed in the spaces around the PTFE fibers. Measurements showed that the pore size was approximately 100-300 nm, the membrane porosity was about 46-55%, the tensile strength was approximately 30 MPa, and the elongation at break was greater than 50%. Depending on the different ratios of PTFE to CNT used, the conductivity of the membrane was approximately 0.13 S/m, 97 S/m, and 850 S/m, respectively.

Example 6

For an example using polylactic acid (PLA) as a processing aid blended with PTFE powder to prepare PTFE hydrophilic microporous membrane, the materials included PLA pellets produced by Natureworks and PTFE powder produced by Mitsubishi Chemical Corporation. The PLA and PTFE materials were dried prior to the experiment. The blending equipment used was a twin-screw extruder, the membrane-forming equipment was a hot press, the washing reagent was dichloromethane, and the annealing equipment was a high-temperature tube furnace.

The first step involved preheating the twin-screw extruder and hot press to 180° C.

The second step: after preheating, the screw began rotating, and PTFE powder and PLA pellets with mass ratios of 2:8 were poured into the feed port for blending. The blended product circulated inside the screw for 10 minutes, with the screw pressure controlled to 7 MPa.

The third step: once the cycle ended, the blended product was extruded and transferred to the hot press, pressed into a membrane with a thickness of 0.03 mm, and then cooled and set.

In the fourth step, the membrane was soaked in 200 mL of dichloromethane solvent for 3 hours to dissolve the PLA phase within the membrane. The membrane is then subjected to repeated washing using a Soxhlet extractor to thoroughly remove any residual PLA. After the washing process is completed, the PTFE membrane is removed, placed on a glass plate to dry naturally, and then detached.

In the fifth step, the membrane was placed in the plasma surface treatment instrument, and after vacuuming, oxygen was introduced. The membrane was subjected to oxygen plasma treatment for 90 seconds before being removed.

Figure 11:
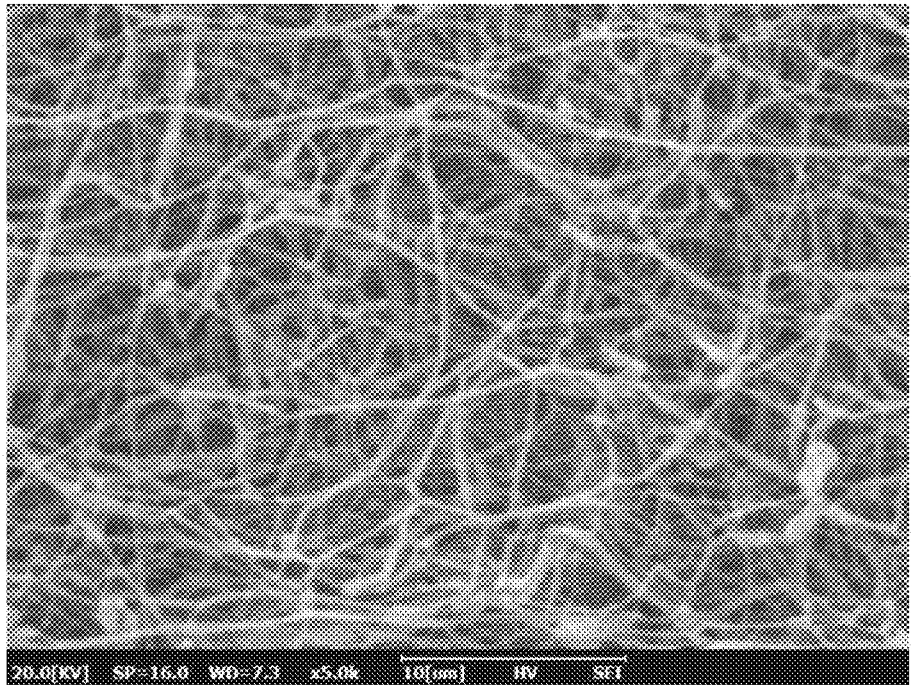
FIG. 11 is a microscopic electron microscope image of the hydrophilic PTFE microporous membrane prepared in Example 5.
Figure 12:
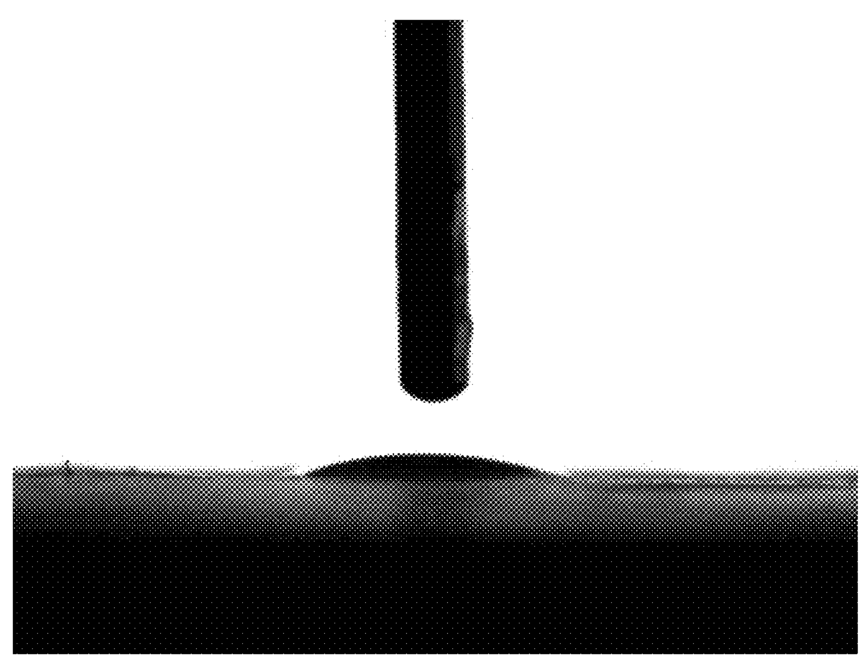
FIG. 12 shows the water contact angle of the hydrophilic PTFE microporous membrane prepared in Example 5.

In this instance, the internal fibrous porous structure is illustrated in FIG. 11. The PTFE fibers were fine, with a diameter of approximately 100 to 200 nm, and the pore size was about 100 to 300 nm. The porosity of the membrane is approximately 70%. As shown in FIG. 12, the hydrophilicity of the membrane was significantly improved after plasma treatment.

The above descriptions are only preferred embodiments of the present invention and are not intended to limit the present invention. Although the present invention has been described in detail with reference to these embodiments, it will be understood by those skilled in the art that they can make modifications or equivalent substitutions to the technical solutions described in these embodiments. Any modification, equivalent replacement, or improvement made within the spirit and principles of the present invention should be included within the scope of the present invention's protection.

What is claimed is:

1. A process for preparing a material based on polytetrafluoroethylene, comprising:

melt blending polytetrafluoroethylene (PTFE) and a processing aid as raw materials, followed by forming;

wherein the processing aid is selected from one or more of thermoplastic polyurethane, polypropylene, polyethylene, polylactic acid, polyvinyl chloride, polyamide, polyvinyl alcohol, polyethylene glycol, polystyrene, poly (butyleneadipate-co-terephthalate), poly (methyl methacrylate), polyethylene terephthalate, polybutylene terephthalate, and paraffin;

wherein the forming comprises extruding the raw materials after the melt blending to obtain an extrudate, then conducting hot pressing at a temperature below 370° C. to obtain a blended membrane, and maintaining the blended membrane under the temperature of the hot pressing for more than 30 minutes before cooling to room temperature;

wherein the extrudate after extrusion can be a tube, a membrane, or a sheet.

2. The process according to claim 1, further comprising a post-processing after the forming;

wherein the post-processing is selected from at least one of microporization, heat treatment, and surface treatment;

wherein the microporization is selected from solvent treatment, high-temperature ablation, and phase separation;

wherein a temperature for the heat treatment is not lower than 200° C.; and/or wherein the surface treatment is selected from plasma treatment, naphthalene sodium treatment, chemical plating, and electroplating.

3. The process according to claim 1, wherein the PTFE has a molecular weight of greater than 1 million or greater than $10^7$ g/mol.

4. The process according to claim 1, wherein the PTFE constitutes 1-50 wt % of the total amount of the raw materials, and the processing aid constitutes 50-99 wt % of the total amount of the raw materials.

5. The process according to claim 1, wherein the melt blending is performed using blending equipment selected from a single screw extruder, twin-screw extruder, open mill, internal mixer, blender, and roll mill; and a temperature for the melt blending is adjusted within a range of 5-100° C. above a melting temperature of the processing aid.

6. The process according to claim 1, wherein the blended membrane has a thickness of 0.02-2 mm.

7. The process according to claim 2, wherein the solvent treatment comprises soaking and/or washing with a solvent, followed by drying;

wherein the soaking lasts for a duration of 100-150 minutes; and wherein the solvent is selected from one or more of water, chloroform, N,N-dimethylformamide, dimethyl sulfoxide, xylene, methanol, ethanol, dichloromethane, acetone, and carbon tetrachloride.

8. The process according to claim 2, wherein the high-temperature ablation is conducted at a temperature higher than a volatilization or decomposition temperature of the processing aid;

wherein the temperature of the high-temperature ablation is at least 50° C. higher than a volatilization or decomposition temperature of the processing aid, and the high-temperature ablation lasting for more than 30 minutes.

9. The process according to claim 2, comprising:

drying the raw materials before feeding into blending equipment for the melt blending to produce a blended product;

wherein a temperature for the melt blending is adjusted to be 5-100° C. higher than a melting temperature of the processing aid, with a pressure for the melt blending set at 5-30 MPa, a rotation speed of 10-100 rpm, and the melt blending lasting for 3-180 minutes; and extruding the blended product, then conducting the hot pressing to achieve the blended membrane with a thickness of 0.02-2 mm, followed by the maintaining the blended membrane under the temperature of the hot pressing and then the cooling to room temperature.

10. The process according to claim 2, further comprising:

subjecting the blended membrane to microporization to obtain a microporous membrane.

11. The process according to claim 10, further comprising:

drying the raw materials before feeding into blending equipment for the melt blending to produce a blended product;

wherein a temperature for the melt blending is adjusted to be 5-100° C. higher than a melting temperature of the processing aid, with a pressure for the melt blending set at 5-30 MPa, and the melt blending lasting for 3-180 minutes;

extruding the blended product, then conducting the hot pressing to achieve the blended membrane with a thickness of 0.02-2 mm, followed by the maintaining the blended membrane under the temperature of the hot pressing and then the cooling to room temperature; and the microporization comprises soaking in a solvent for 100-150 minutes, removing to dry and washing with the solvent, and after the washing, removing to dry again to obtain the microporous membrane.

12. The process according to claim 10, comprising:

drying the raw materials before feeding into blending equipment for the melt blending to produce the blended product;

wherein a temperature for the melt blending is adjusted to be 5-100° C. higher than a melting temperature of the processing aid, with a pressure for the melt blending set at 5-30 MPa, and the melt blending lasting for 3-180 minutes;

extruding the blended product, then conducting the hot pressing to achieve the blended membrane with a thickness of 0.02-2 mm, then the maintaining the blended membrane under the temperature of the hot pressing and then the cooling to room temperature, followed by washing with a solvent, and after the washing, removing to dry to obtain the microporous membrane.

13. The process according to claim 2, comprising:

melt blending the raw materials, then extruding and pressing to obtain the blended membrane, subjecting the blended membrane to microporization to obtain a microporous membrane, and then heat treating the microporous membrane at a temperature below 370° C.

14. The process according to claim 13, comprising:

drying the raw materials before feeding into blending equipment for the melt blending to produce the blended product;

wherein a temperature for the melt blending is adjusted to be 5-100° C. higher than a melting temperature of the processing aid, with a pressure for the melt blending set at 5-30 MPa, and the melt blending lasting for 3-180 minutes;

extruding the blended product, then conducting the hot pressing to achieve the blended membrane with a thickness of 0.02-2 mm, followed by the maintaining the blended membrane under the temperature of the hot pressing and then the cooling to room temperature;

wherein the microporization comprises soaking in a solvent for 100-150 minutes, removing to dry and washing with the solvent, and after the washing, removing to dry again to obtain the microporous membrane; and then annealing the microporous membrane at a temperature below 370° C., and after the annealing, cooling to room temperature.

15. The process according to claim 13, comprising:

drying the raw materials before feeding into blending equipment for the melt blending to produce the blended product;

wherein a temperature for the melt blending is adjusted to be 5-100° C. higher than a melting temperature of the processing aid, with a pressure for the melt blending set at 5-30 MPa, and the melt blending lasting for 3-180 minutes;

extruding the blended product, then conducting the hot pressing to achieve the blended membrane with a thickness of 0.02-2 mm, then maintaining the blended membrane under the temperature of the hot pressing and then the cooling to room temperature, followed by washing with a solvent, and after the washing, removing to dry to obtain the microporous membrane; and then annealing the microporous membrane at a temperature below 370° C., and after the annealing, cooling to room temperature.

16. The process according to claim 1, comprising:

conducting the melt blending, followed by the extruding and the hot pressing to obtain the blended membrane, and subjecting the blended membrane to solvent treatment, and then performing surface treatment.

17. The process according to claim 16, comprising:

drying the raw materials before feeding into blending equipment for the melt blending to produce the blended product;

wherein a temperature for the melt blending is adjusted to be 5-100° C. higher than a melting temperature of the processing aid, with a pressure for the melt blending set at 5-30 MPa, and the melt blending lasting for 3-180 minutes;

extruding the blended product, then conducting the hot pressing to achieve the blended membrane with a thickness of 0.02-2 mm, followed by the maintaining the blended membrane under the temperature of the hot pressing and then the cooling to room temperature;

then soaking in a solvent for 100-150 minutes, followed by washing with the solvent after removal, or washing directly with the solvent without prior soaking, and after the washing, drying to obtain a microporous membrane; and then subjecting the microporous membrane to plasma treatment.

18. The process according to claim 1, wherein the raw materials comprise functional additives, selected from modifiers and fillers;

wherein the modifiers are selected from one or more of porogens, antibacterial agents, foaming agents, antistatic agents, flame retardants, plasticizers, heat stabilizers, antioxidants, light stabilizers, mold inhibitors, colorants, whitening agents, fillers, coupling agents, lubricants, and mold release agents; the fillers are selected from one or more of thermal conductive fillers, electrically conductive fillers, fiber fillers, wear-resistant fillers, and color-changing fillers; and wherein the functional additives constitute 0-50 wt % of the total amount of raw materials.

* * * * *